Oct. 13, 1925.
H. S. MYERS
HOIST ATTACHMENT FOR TRACTORS
Filed Nov. 30, 1921 3 Sheets-Sheet 1
1,557,470
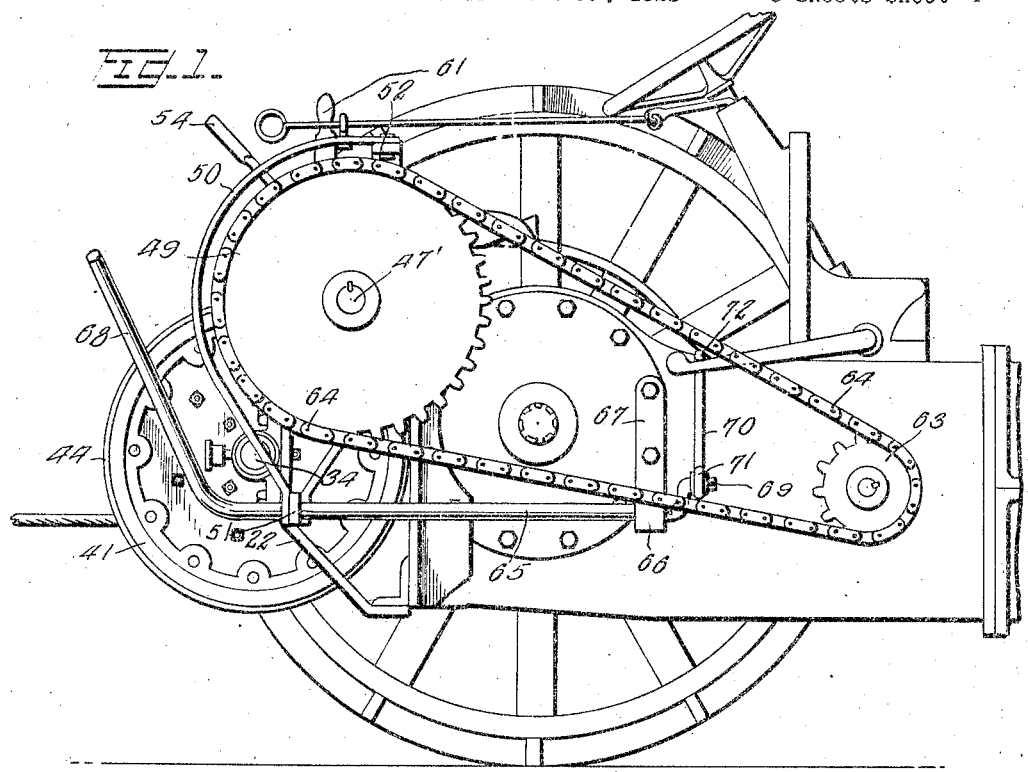
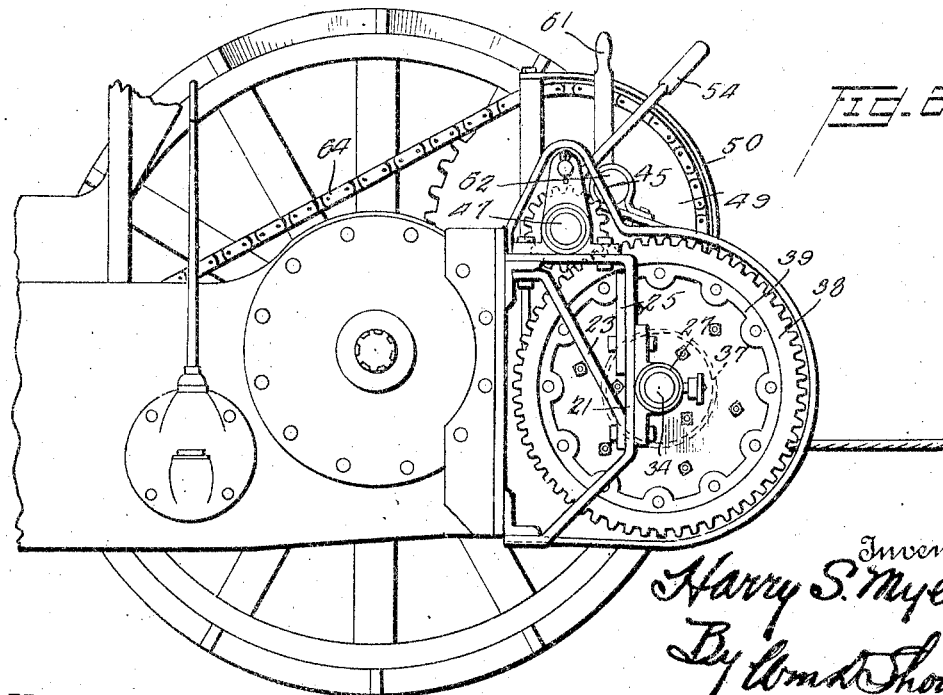
Inventor
Harry S. Myers
By [signature]
Attorney

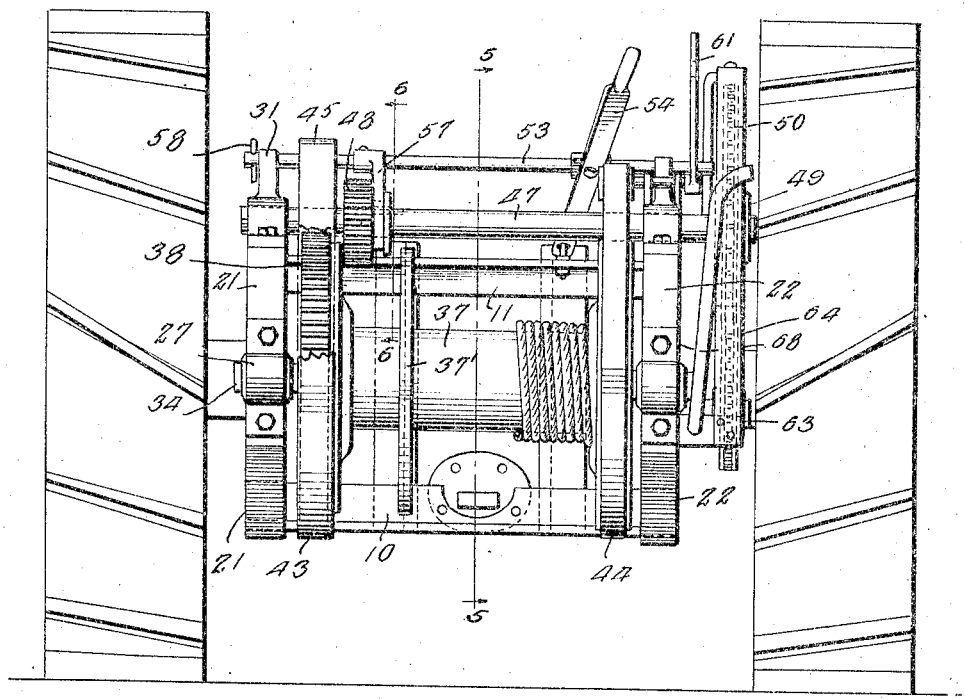
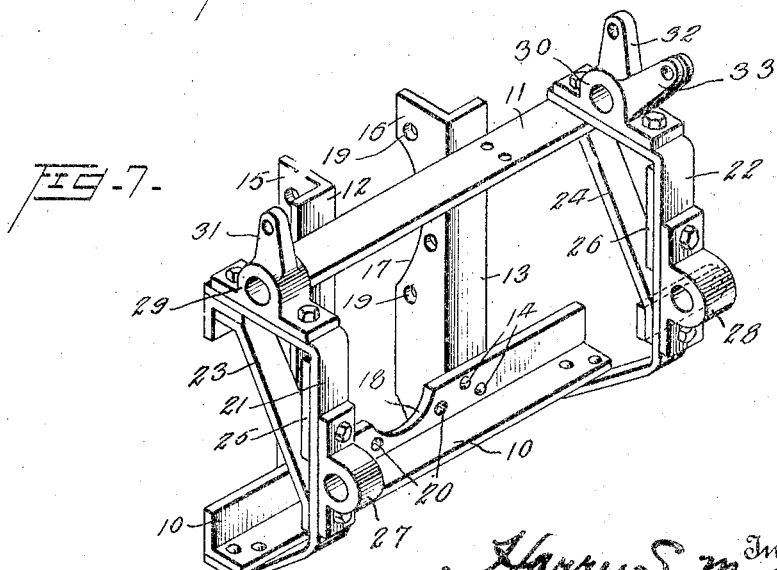

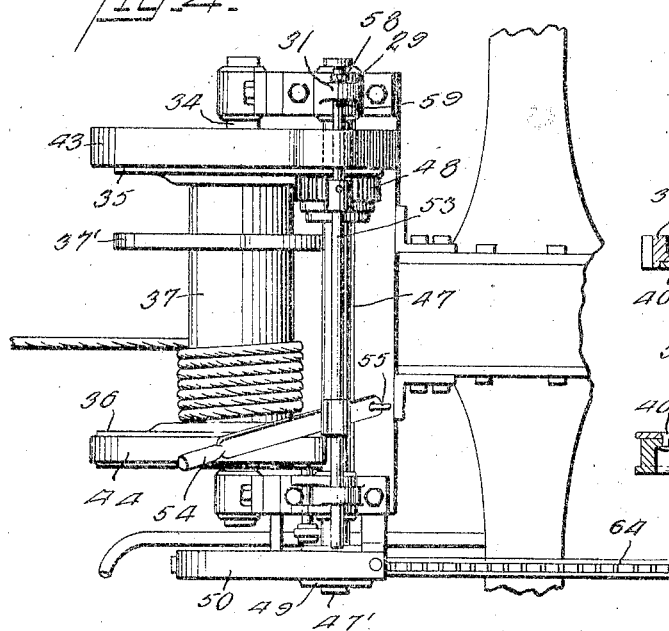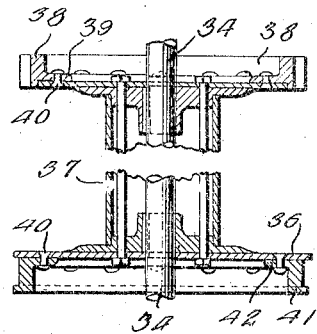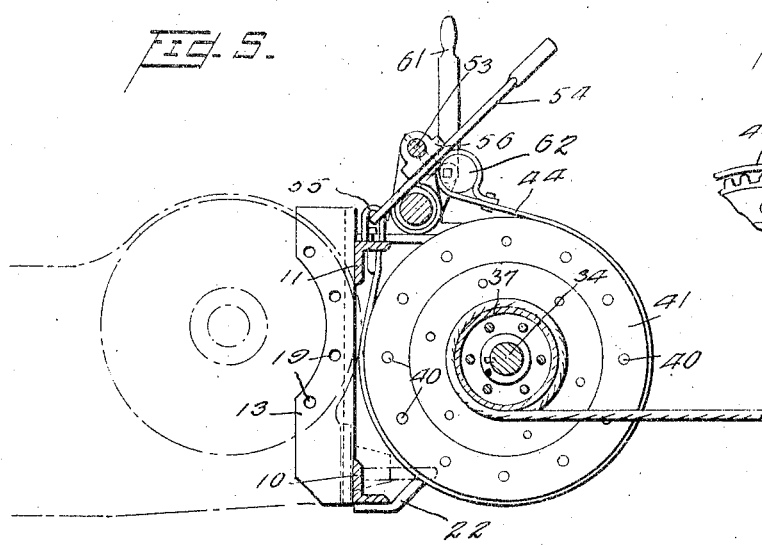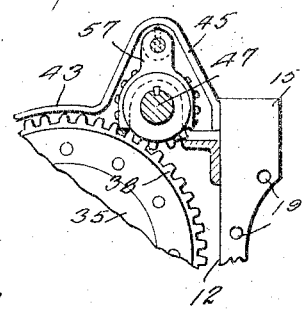

Patented Oct. 13, 1925.

1,557,470

UNITED STATES PATENT OFFICE.

HARRY S. MYERS, OF VAN, PENNSYLVANIA.

HOIST ATTACHMENT FOR TRACTORS.

Application filed November 30, 1921. Serial No. 518,980.

*To all whom it may concern:*

Be it known that I, HARRY S. MYERS, a citizen of the United States, residing at Van, in the county of Venango and State of Pennsylvania, have invented certain new and useful Improvements in Hoist Attachments for Tractors, of which the following is a specification.

This invention relates to a hoisting machine, and more particularly to such a machine designed for ready attachment to a standard form of tractor. The special adaptation shown and described for the purposes of disclosure of the principles of the invention is a hoisting mechanism adapted to be attached to a tractor at a point in rear of the working parts thereof and between the tractive wheels, and securing power for its operation from the transmission mechanism of the tractor.

The invention has for its object the provision of a hoisting mechanism readily attachable to a tractor of standard construction and which may be carried by the tractor without interference with any of the ordinary duties imposed upon the same. A further object is the selection of a mounting for such a hoisting attachment to the tractor where it will be of maximum use and wherein the hoisting mechanism may be driven from the transmission mechanism of the tractor and controlled at a convenient position at the rear of the tractor. Another object of the invention is the provision of such an attachment to a tractor in a position whereby it may be used as a hoist for the tractor itself in order that the tractor may be placed upon hillsides which could not be reached in the ordinary travel of the tractor.

A further object of the invention is the improvement of the details of construction of such hoist attachment whereby it can be readily attached in a convenient position at the rear of the tractor, driven from the transmission mechanism of the tractor, controlled from the rear of the tractor, and the parts located out of the way in the ordinary uses to which tractors are placed.

Other objects and advantages of the invention will hereinafter appear in the following description and the novel features thereof will be particularly pointed out in the appended claims.

Like reference numerals refer to like parts throughout the several figures of the drawings, in which—

Figure 1 is a side elevation of my hoisting attachment with one of the tractor wheels removed, Figure 2 is a similar view from the opposite side of the machine, Figure 3 is a rear elevation of the winch attachment, Figure 4 is a plan showing the hoist attachment mounted upon the differential housing of the tractor, Figure 5 is a sectional view taken upon the line 5—5 of Figure 3 looking in the direction of the arrow, Figure 6 is a similar sectional view taken upon the line 6—6 of Figure 3, Figure 7 is a perspective of the frame of the hoisting attachment, and Figure 8 is a detail view showing the construction of the drum.

It will be understood that the invention may be varied in its details of construction and that the specific embodiment illustrated and described herein is only indicative thereof; the specific embodiment, however, is one which has been found to be practical in its construction and operation.

The hoisting attachment comprises a framework which has been shown in perspective in Figure 7 and which is adapted to be attached to the rear portion of a tractor body constituting the housing for the differential gear and drive axles. In this framework are mounted two shafts, which will be designated, respectively, the drum shaft and the drive shaft. Associated with the drive shaft is the driving connection with the tractor, and associated with the drum shaft are the drum, its gear and brake. Means are provided for engaging the gears of the hoist, for applying the brake and for controlling the engine clutch and throttle from the rear of the tractor. These parts will be specifically described and their functions pointed out, after which a recital of their conjoint operation will be given.

Referring to Figure 7, the hoist frame is shown as comprising a base composed of the angle rails 10 and 11, and the cross angle bars 12 and 13, suitably riveted or bolted together, as indicated at 14. In the portions 15 and 16 of the cross angle bars 12 and 13 are formed curved recesses 17, and in the rail 10 is formed a curved recess 18 and in said members 12, 13 and 10 adjacent said curved recesses are provided apertures 19 and 20. By means of this structure the frame is attached to the differential housing of the tractor, as clearly illustrated in Figures 1, 2 and 3. Certain of the bolts of the tractor housing and the draw bar casing are removed, and the hoisting attachment placed in position so that the apertures 19 and 20 will be in register with corresponding openings in these portions of the tractor. Slightly longer bolts than those removed are then employed to attach the angle bars 12 and 13 and the rail 10 in place.

Again referring to Figure 7, it will be seen that at each end of the rails 10 and 11 are attached bearing-carrying members designated by the numerals 21 and 22, which are braced, respectively, by the struts 23 and 24. It has been found desirable to further brace the member 21 by the strap 25 while the strap iron 26 is associated with the member 22 and brace 24 for a purpose to be hereinafter set forth.

Upon the vertical sections of the members 21 and 22 are bolted the bearings 27 and 28 designed to support the drum shaft while upon the horizontal sections of these members are bolted the bearings 29 and 30 for a drive shaft, bolts being largely used to attach the other elements of the frame together, as will be apparent from an inspection of the several figures of the drawings. The bearings 29 and 30 are provided with apertured ears 31 and 32 for the mounting of a sliding shift rod to be hereinafter referred to, while the bearing 30 is in addition provided with a pair of lugs 33 with apertures therein to constitute a support for a rotating brake control lever, as will hereinafter appear.

Referring now to Figures 2, 4 and 8, the numeral 34 designates the drum shaft to which are keyed the shouldered hubs carrying disks 35 and 36 and supporting the drum tube 37, these parts being clamped together by the rods, as shown, and constituting the drum or spool for winding the hoisting cable. To the disk 35 is attached the skeleton gear 38 comprising the rim bearing the gear teeth and the integral flange 39, which flange is secured by the bolts 40 to the disk 35. The shape of this flange is readily understood from an inspection of Figure 2.

To the disk 36 is attached the brake rim or drum 41 having a flange similar to that on the skeleton gear, and the bolts 42 are the means employed for securing the flange to the disk. At any desired point on the drum may be temporarily clamped a two-part disk 37' to limit the winding space.

A guard 43 is provided for the gear rim, which is extended and humped as shown at 45 in Figure 6, being attached at its ends to the rails 10 and 11, as can best be seen in Figure 2. The purpose of this guard is to protect the gear wheel from the accumulation of dirt or other foreign matter in the transportation of the machine, which would greatly interfere with its efficient operation and perhaps cause injury to the machine in starting.

The numeral 44 designates the brake band, which, as shown in Figure 5, is attached at one end to the rail 11. After passing around the brake rim it is attached to the tightening means therefor in a manner to be hereinafter described.

The drive shaft of the hoist is designated by the numeral 47 and mounted for rotation in the bearings 29 and 30. This drive shaft has slidably keyed to it the pinion 48, which is capable of being shifted in a manner to be set forth to be either in mesh with the gear 38, as shown in Figures 2 and 6 or out of mesh therewith as shown in Figures 3 and 4.

The shaft is extended as at 47', where it has keyed to it a sprocket 49 protected by a guard 50 supported from the frame of the hoist by suitable legs 51 and 52.

In the ears 31 and 32 is mounted a shiftable rod 53 which is moved by manipulation of the lever 54, which is attached to the frame of the hoist through the instrumentality of the U-bolt 55 and to the rod 53 by means of the block and screw connection 56.

Referring now to Figure 3, it will be understood that a shifting of the lever 54 to the left will cause the rod to be correspondingly shifted. The yoke 57 held to the rod will cause the pinion 48 and its integral collar to be brought into mesh with the gear 38. It will be noted that the rod carries at its outer end (see Figure 4) a cotter pin 58 designed to limit its movement in one direction. A hole 59 is provided in the rod 53 at the opposite side of the ear 31, the purpose of which is to permit the removal of the cotter pin from its position at one side of the ear to the other, when it will act to prevent the shifting of the rod 53 to cause intermeshing of the pinion 48 and gear 38. This is particularly desirable in transporting the tractor from place to place when the hoist is not being used and the jolting of the tractor over rough ground is liable to cause the hoist gears to become engaged with the possible injury to the machine as a result.

It will be noted from Figures 4 and 5 that the lugs 33 rotatably support a short shaft 60, which at one end is provided with an operating handle 61 and at its opposite end has mounted rigidly and eccentrically thereon a disk 62, around which the free end of the brake band is passed. Upon a movement of the lever 61 to the right in Figure 5 the eccentrically mounted disk will cause the band 44 to grip the rim of the brake drum and thereby brake the hoisting mechanism.

There remains to be explained how the power is taken from the tractor transmission gearing. Sprocket 63 is provided as a substitute for the driving pulley common in tractor structures receiving power from the transmission mechanism of the tractor between the clutch and the gear shift. This sprocket is continuously rotating as long as the engine is running and the clutch is engaged. Upon a release of the clutch, however, this sprocket will stop. I have provided means for driving the hoisting apparatus from this sprocket and for controlling from the rear of the machine the engagement and disengagement of the clutch. A sprocket chain 64 passing over the sprockets 63 and 49 is the means selected for transmitting power from the engine to the hoist.

In order to stop the operation of the hoist at any time, recourse is had to the clutch control shown in Figure 1 of the drawing. This comprises a shaft 65 supported at one end in the bearing aperture in the leg 51 and at its other end in an eye 66 formed in the strap 67. At its rear the shaft 65 is bent to form an operating handle 68, and at its forward end it is bent to provide a crank 69. This crank operates a pedal engaging pull 70 which comprises an eye 71 mounted upon the end of the crank between washers and held thereon by a cotter pin, and a hook end 72 engaging over the clutch control pedal. The strap 67 is attached by means of bolts to the transmission case of the tractor. It will be seen that a manipulation of the handle 68 will result in a depression of the clutch pedal and the release of the clutch and that a continued turning of the handle 68 will result in a carrying of the crank beyond its dead center when the clutch will be held released indefinitely.

Before proceeding to a description of the operation of the machine, it is thought that a recital of some of the uses to which the hoist of the present invention may be placed will aid in an understanding of the principles involved. In the oil region of Pennsylvania, where this invention is being manufactured and sold, the wells require periodic bailing to remove the accumulation of water therein. The casings of these wells must also be removed at times. The wells are often located upon the sides of hills where it is practically impossible to place hoisting machinery except at great expenditure of effort. The hoisting attachment of the present invention satisfies in a special manner the demands in this field. It is light and does not therefore interfere materially with the transportation of a tractor from place to place or in the performance of the usual duties required of tractors. The maximum width of drum is available for winding purposes in case it is desired to bail a well, while the effective width of the drum may be greatly diminished by the placing thereon of the removable two-part disk or partition 37', as when it is desired to use the hoist for casing drawing. The location of the hoist at the rear of the tractor in a relatively low-down position enables it to be carried without interfering with the transportation of the tractor, as well as to act as a hoist for the tractor itself when it is desired to reach points on the hillsides to which the tractor cannot be transported in the usual manner. It is only necessary in that event to play out a sufficient length of cable from the drum and secure the end thereof to an anchor above the point of destination and then use the hoist as a means for drawing the tractor backwards up the steep incline to that point. With equal facility the tractor may be lowered down an incline. The provision of extension throttle and clutch controls to the rear of the hoist and the presence thereof brake and gear shifts give the hoist attachment of this invention the equivalent character of a stationary machine when the tractor has been tied down. It will be noted that the several extension controls may be easily disconnected and that provision has been made for the locking of the gear 48 out of mesh with gear wheel 38, making safe the transportation of the tractor with the hoist attached.

The following résumé of the conjoint operation of the parts will now be sufficient to a complete understanding of the principles of the invention: The hoist having been attached to the tractor and the machine transported to its point of use at a well, the tractor is tied down in any convenient manner. The tractor gear shift is placed in neutral position. The engine is started with the gear 48 out of mesh with the wheel 38. With the clutch engaged the sprocket 63 through the chain 64 will drive the sprocket 49 which in turn rotates the drive shaft 47 with the pinion 48. Upon a depression of the extension clutch lever 68 the clutch is released stopping the drive of the transmission members 63, 64, 49, 47 and 48. In this condition the pinion 48 may be shifted by the lever 54 into mesh with the gear 38. Upon re-engagement of the clutch, power will be transmitted through members 63, 64, 49, 47, 48 and 38 to the drum 37 for winding purposes.

When it is desired to unwind the cable, it is only necessary to release the clutch when the weight of the lifted load will cause retrograde movement of the hoist drive mechanism, or the pinion 48 can be shifted to unmesh it from the gear 38 when the drum may be rotated manually. In either event the unwinding of the drum is under the control of the brake, as is usual in hoisting machinery.

Having described my invention, what I claim as new and desire to secure by Letters Patent is:

1. In a tractor of the farm type having an automotive organization which includes a motor, propelling wheels, transmission gearing, also a differential gear, transmitting power from said motor to said wheels, a winding drum carried by the housing of the differential gear of said gearing, and gearing other than said transmission gearing, arranged to transmit power from the motor to said drum.

2. In a tractor of the farm type having an automotive organization which includes a motor, propelling wheels, transmission gearing which comprises a differential gear transmitting power from said motor to said wheels, also a belt-pulley shaft driven by said motor; a winding drum carried by the housing of said differential gear, driving gearing other than the automotive transmission gearing arranged to transmit power from said belt-pulley shaft to said drum, means rendering said driving gearing operative or inoperative at will, and a brake for said drum arranged to control the reverse action thereof.

3. In a tractor of the farm type having an automotive organization which includes a motor, propelling wheels, transmission gearing which includes a differential gear transmitting power from said motor to said wheels, also a belt-pulley shaft driven by said motor; an organization cooperating with the foregoing comprising, in combination, a drum shaft revolubly carried by the housing of said differential gear, a winding drum operably carried by said drum-shaft, speed-reducing, driving gearing transmitting power from said belt-pulley shaft to said drum-shaft, and means rendering said driving gearing operative or inoperative at will.

4. In a tractor of the farm type having an automotive organization which includes a motor, propelling wheels, transmission gearing transmitting power from said motor to said wheels, a carrying structure for said organization, also a belt-pulley shaft driven by said motor; an organization cooperating with the foregoing and comprising in combination, a drum-shaft revolubly carried by said carrying structure and positioned rearwardly of said wheels, a winding drum and a gear fixed to said drum-shaft, a brake-member carried by said drum, a pinion shaft revolubly carried by said structure, a pinion on said pinion shaft for driving said gear, a transmission member carried by said pinion shaft, a transmission member carried by said belt-pulley shaft, means operably connecting said transmission members, and means cooperating with said brake member so as to control the reverse motion of said drum.

5. In a tractor of the farm type having an automotive organization which includes a motor, propelling wheels, transmission gearing, a differential gear and drive axles transmitting power from the motor to said wheels, a winding drum mounted on the rear portion of the tractor body comprising the housing for the differential gear and drive axles, and gearing other than said transmission gearing arranged to transmit power from the motor to the drum.

6. In a tractor of the farm type having an automotive organization which includes a motor, propelling wheels, transmission gearing, a differential gear and drive axles transmitting power from the motor to said wheels, a winding drum mounted on the rear portion of the tractor body comprising the housing for the differential gear and drive axles, a power shaft capable of being driven from the motor independently of said transmission gearing, and driving connections between the power shaft and drum.

7. In a tractor of the farm type having an automotive organization which includes a motor, propelling wheels, transmission gearing, a differential gear and drive axles transmitting power from the motor to said wheels, a power shaft on said tractor driven from the motor, a winding drum carried by the rear portion of the tractor body housing the differential gear and drive axles, gearing interposed between the winding drum and the power shaft for rotating said drum, and a plurality of power controls for said drum operable from the same proximate position.

8. In combination a tractor having its rear body portion in the form of a relatively large housing comprising a central portion inclosing the differential gear of the tractor and conical sections inclosing the drive axles and bolted to said central portion, a draw bar cap below said central portion, and a winding drum having a frame secured to the rear body portion of the tractor and to the said draw bar cap.

9. In combination a tractor having its rear body portion in the form of a relatively large housing comprising a central portion inclosing the differential gear of the tractor and conical sections inclosing the drive axles and bolted to said central portion, and a winding drum having a frame with bracket elements secured to the rear portion of the tractor by the bolts securing the central and conical sections together.

10. In a hoist attachment for tractors of the type having a differential housing at the rear thereof, a frame comprising a pair of rails carrying the operative elements of said hoist and vertical cross angle bars adapted to straddle the differential housing of the tractor and be secured thereto by the bolts of said housing.

11. In a hoist attachment for tractors of the type having a differential housing and draw-bar cap at the rear thereof, a frame comprising a pair of rails carrying the operative elements of the hoist and a pair of angle cross bars, the cross bars and lower rail being recessed to respectively fit the sides of the differential housing and the bottom of the draw-bar cap and being adapted to be secured to the tractor frame by the bolts securing these tractor elements in place.

12. In a tractor of the farm type having an automotive organization which includes a motor, propelling wheels, transmission gearing, a differential gear and drive axles transmitting power from the motor to said wheels, a frame supported on the rear portion of the tractor body comprising the housing for the differential gear and drive axles, a winding drum mounted on said frame, and gearing other than said transmission gearing arranged to transmit power from the motor to the drum.

13. In a tractor of the farm type having an automotive organization which includes a motor, propelling wheels, transmission gearing, a differential gear and drive axles transmitting power from the motor to said wheels, a frame supported on the rear portion of the tractor body comprising the housing for the differential gear and drive axles, a winding drum and a gear reducing countershaft mounted on said frame, and gearing other than said transmission gearing arranged to transmit power from the motor to the countershaft to drive said drum.

14. In a tractor of the farm type having an automotive organization which includes a motor, propelling wheels, transmission gearing, a differential gear and drive axles transmitting power from the motor to said wheels, a power shaft on said tractor driven from the motor, a tractor body whose rear comprises the differential and drive axle housing, a gear reducing countershaft carried by the differential housing, a winding drum mounted on the tractor body in proximity to and driven by said countershaft, and a driving connection between said countershaft and said power shaft.

15. In a tractor of the farm type having an automotive organization which includes a motor, propelling wheels, transmission gearing, a differential gear and drive axles transmitting power from the motor to said wheel, a power shaft on said tractor driven from the motor, a tractor body whose rear comprises the differential and drive axle housings, a gear reducing countershaft carried by the rear of said tractor body, a winding drum mounted on the tractor body in proximity to and driven by said countershaft, and a driving connection between said countershaft and said power shaft.

In testimony whereof I affix my signature.

HARRY S. MYERS.